(12) United States Patent
Seo et al.

(10) Patent No.: US 11,860,512 B2
(45) Date of Patent: Jan. 2, 2024

(54) CAMERA MODULE

(71) Applicant: Samsung Electro-Mechanics Co., Ltd., Suwon-si (KR)

(72) Inventors: Bo Sung Seo, Suwon-si (KR); Hong Joo Lee, Suwon-si (KR); Young Bok Yoon, Suwon-si (KR); Jung Seok Lee, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 485 days.

(21) Appl. No.: 16/927,015

(22) Filed: Jul. 13, 2020

(65) Prior Publication Data
US 2021/0173224 A1   Jun. 10, 2021

(30) Foreign Application Priority Data

Dec. 10, 2019   (KR) .................. 10-2019-0164033

(51) Int. Cl.
*G03B 13/36* (2021.01)
*G02B 27/64* (2006.01)
(Continued)

(52) U.S. Cl.
CPC ............. *G03B 13/36* (2013.01); *G02B 7/021* (2013.01); *G02B 7/09* (2013.01); *G02B 27/646* (2013.01);
(Continued)

(58) Field of Classification Search
CPC ........ G02B 27/646; G02B 7/021; G02B 7/09; G03B 13/36; G03B 17/02; G03B 5/00; G03B 2205/0069; H04N 5/2254; H04N 5/2257; H02K 41/0354; H05K 1/0274; H05K 2201/09027; H05K 2201/10121; H05K 2201/10151
See application file for complete search history.

(56) References Cited

U.S. PATENT DOCUMENTS

| 8,818,181 B1 | 8/2014 | Hwang et al. |
| 9,086,613 B1 | 7/2015 | Baik et al. |
(Continued)

FOREIGN PATENT DOCUMENTS

| CN | 103995414 A | 8/2014 |
| CN | 106707454 A | 5/2017 |
(Continued)

OTHER PUBLICATIONS

Indian Office Action dated Jul. 4, 2021 issued in counterpart Indian Patent Application No. 202014030199 (2 pages in Indian and 5 pages in English).
(Continued)

*Primary Examiner* — Darryl J Collins
*Assistant Examiner* — Tamara Y. Washington
(74) *Attorney, Agent, or Firm* — NSIP Law

(57) ABSTRACT

A camera module includes a carrier supported on a housing and movable in an optical axis direction, at least one frame supported on the carrier and movable, relative to the carrier, in at least one direction perpendicular to the optical axis direction, and a lens module supported on the frame. The frame is supported on the carrier such that attractive force acts in the at least one direction perpendicular to the optical axis direction.

18 Claims, 13 Drawing Sheets

(51) Int. Cl.
- *G02B 7/09* (2021.01)
- *G02B 7/02* (2021.01)
- *G03B 17/02* (2021.01)
- *H04N 23/55* (2023.01)
- *H04N 23/57* (2023.01)

(52) U.S. Cl.
CPC .............. *G03B 17/02* (2013.01); *H04N 23/55* (2023.01); *H04N 23/57* (2023.01)

(56) References Cited

U.S. PATENT DOCUMENTS

| | | |
|---|---|---|
| 10,154,182 B2 | 12/2018 | Hwang et al. |
| 2011/0013283 A1 | 1/2011 | Sato |
| 2013/0170039 A1 | 7/2013 | Miyoshi |
| 2014/0160311 A1* | 6/2014 | Hwang ................ G02B 27/646 348/208.99 |
| 2015/0049209 A1 | 2/2015 | Hwang et al. |
| 2017/0052387 A1 | 2/2017 | Yu et al. |
| 2017/0139225 A1* | 5/2017 | Lim ..................... G02B 27/646 |
| 2019/0004328 A1 | 1/2019 | Lee et al. |
| 2019/0058817 A1 | 2/2019 | Seo et al. |
| 2021/0173223 A1 | 6/2021 | Seo et al. |

FOREIGN PATENT DOCUMENTS

| | | |
|---|---|---|
| CN | 108153082 A | 6/2018 |
| CN | 109413306 A | 3/2019 |
| CN | 113050341 A | 6/2021 |
| KR | 10-2015-0020951 A | 2/2015 |
| KR | 10-2016-0012455 A | 2/2016 |
| KR | 10-2018-0024145 A | 3/2018 |
| KR | 10-2018-0071223 A | 6/2018 |
| KR | 10-2019-0002149 A | 1/2019 |
| KR | 10-2019-0004121 A | 1/2019 |
| KR | 10-2019-0029169 A | 3/2019 |
| KR | 10-2019-0061439 | 6/2019 |

OTHER PUBLICATIONS

Chinese Office Action dated Dec. 14, 2021 in counterpart Chinese Patent Application No. 202010984467.X (7 pages in English and 8 pages in Chinese).

Korean Office Action dated Feb. 2, 2021 in counterpart Korean Patent Application No. 10-2019-0164033 (8 pages in English)(7 pages in Korean).

* cited by examiner

CAMERA MODULE

CROSS-REFERENCE TO RELATED APPLICATION(S)

This application claims the benefit under 35 USC 119(a) of Korean Patent Application No. 10-2019-0164033 filed on Dec. 10, 2019 in the Korean Intellectual Property Office, the entire disclosure of which is incorporated herein by reference for all purposes.

BACKGROUND

1. Field

This application relates to a camera module.

2. Description of Related Art

The use of subminiature camera modules in mobile communications terminals such as smartphones, tablet PCs, laptop computers, and the like, has increased.

With the miniaturization of mobile communications terminals, the quality of images obtained by these terminals may be degraded because these terminals are often held by hand while images are captured. To obtain clear images despite the instability introduced into the images due to the inadvertent shaking of hands holding the terminals, a technology that compensates for the effect of shaking is required.

An actuator for optical image stabilization (OIS) may be used to compensate for the involuntary shaking introduced by the instability of hands holding the terminals. An OIS actuator may move a lens module in a direction, perpendicular to an optical axis direction, to compensate for the involuntary shaking.

A structure, in which a plurality of cameras including a wide-angle camera and a telephoto camera are mounted adjacent to a mobile terminal, has been implemented to improve the performance of camera functions.

However, when an OIS actuator using a magnet and a coil is employed for miniaturization and accuracy in driving, performance may be deteriorated due to magnetic interference between camera modules adjacent to each other.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An actuator having a structure provided with a magnet and a coil.

A structure, capable of significantly reducing leakage of a magnetic field, while employing an actuator using a magnetic field and a coil for miniaturization and accurate driving.

A structure to significantly reduce magnetic field interference, such that a plurality of camera modules may be freely arranged even when they are disposed adjacent to each other.

In one general aspect, a camera module includes a carrier supported on a housing and movable in an optical axis direction, at least one frame supported on the carrier and movable, relative to the carrier, in at least one direction perpendicular to the optical axis direction, and a lens module supported on the frame. The frame is supported on the carrier such that attractive force acts in the at least one direction perpendicular to the optical axis direction.

The camera module may include a yoke disposed on a side surface of the housing that supports the frame, and the yoke may include a material configured to prevent leakage of a magnetic field.

The at least one frame may include a first frame, and the first frame may be supported on the carrier such that attractive force acts in a first direction perpendicular to the optical axis direction.

The lens module may be supported on the first frame such that attractive force acts in a second direction perpendicular to the optical axis direction and perpendicular to the first direction.

The first frame may include a first magnet and the lens module may include a second magnet, the housing may include a first yoke and a second yoke, and the first magnet and the first yoke may be arranged at a first interval along the first direction, and the second magnet and the second yoke may be arranged at a second interval along the second direction.

The first frame may include a first magnet and the lens module may include a second magnet, the first magnet may be magnetized to have at least N and S poles along a surface opposing the carrier along the first direction perpendicular to the optical axis direction, and the second magnet may be magnetized to have at least N and S poles along a surface opposing the carrier along the second direction perpendicular to the optical axis direction.

The first frame may be movable, relative to the carrier, along a direction perpendicular to the first direction, and the lens module may be movable, relative to the first frame, along a direction perpendicular to the second direction.

The at least one frame may include a first frame and a second frame.

The first frame may be closely supported to a first surface of the carrier parallel to the optical axis direction, and the second frame may be closely supported to a second surface of the carrier parallel to the optical axis direction.

The first frame may include a first magnet and the second frame may include a second magnet, the housing may include a first yoke and a second yoke, and the first magnet and the first yoke may be arranged at a first interval along a first direction perpendicular to the optical axis direction, and the second magnet and the second yoke may be arranged at a second interval along a second direction perpendicular to the optical axis direction.

The first frame may include a first magnet and the second frame may include a second magnet, and each of the first magnet and the second magnet may be magnetized to have at least N and S poles along an opposing surface of the housing along the at least one direction perpendicular to the optical axis direction.

The first frame and the second frame may be relatively movable along a contact surface of the carrier along the at least one direction perpendicular to the optical axis direction.

The lens module may include a lens barrel, including at least one lens accommodated therein, and a lens holder accommodating the lens barrel therein, and the lens holder may be interposed between the first frame and the second frame along the optical axis direction.

The lens holder may be configured to be movable along a direction perpendicular to the first direction, or to be movable together with the second frame along a direction perpendicular to the second direction.

The camera module may include rolling members disposed between the first frame and the lens holder and between the second frame and the lens holder along the optical axis direction, respectively.

In another general aspect, a camera module includes an autofocusing part including a carrier supported on a housing and configured to be movable in an optical axis direction and a shake correction portion including at least one frame movable, relative to the carrier, in at least one direction perpendicular to the optical axis direction and a lens module supported on the frame. The carrier and the at least one frame are configured to be movable on a surface parallel to the optical axis direction while a rolling member is interposed between a relative member and the carrier and the at least one frame.

In another general aspect, a camera module includes an autofocusing part including a carrier disposed on a housing to be movable in an optical axis direction, a shake correction unit including a lens module configured to be movable, relative to the carrier, in at least one direction perpendicular to the optical axis direction, and an autofocusing coil, to provide driving force to the autofocusing part, and first and second shake correction coils to provide driving force to the shake correction portion. The autofocusing coil and the first and second shake correction coils are disposed on surfaces of the housing parallel to the optical axis direction. The housing includes a plurality of yokes, respectively covering the autofocusing coil and the first and second shake correction coils to prevent leakage of a magnetic field.

In another general aspect, a camera module includes a first member configured to move along an optical axis direction and including a first magnet configured to generate force to move the first member along a first direction perpendicular to an optical axis; a second member configured to be coupled to the first member and including a second magnet configured to generate force to move the second member relative to the first member along a second direction perpendicular to the optical axis; and a lens barrel fixed to the first member and configured to be moved along the first direction by movement of the first member and to be moved along the second direction by movement of the second member relative to the first member.

The camera module may include a carrier configured to accommodate the first member and the second member and to move along the optical axis direction; and a housing including a first yoke and second yoke. The first frame and the second frame may be closely supported on a sidewall of the carrier parallel to the optical axis direction by attractive force with the first yoke and the second yoke.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
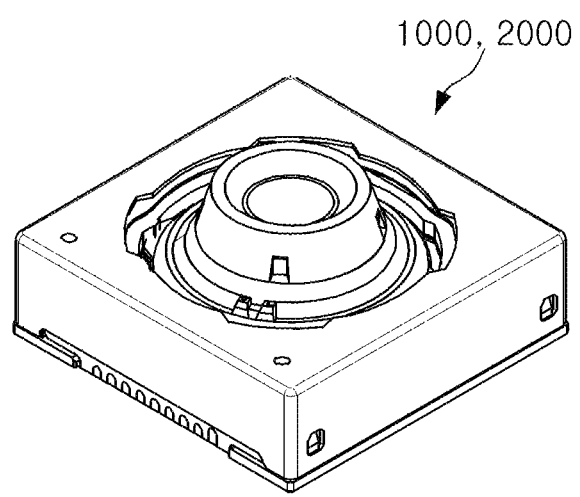
FIG. 1 is an assembled perspective view of a camera module according to an example.
Figure 1:
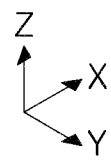

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that would be well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will fully convey the scope of the disclosure to one of ordinary skill in the art.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

Hereinafter, while examples will be described in detail with reference to the accompanying drawings, it is noted that examples are not limited to the same.

The various examples to a camera module, and may be applied to portable electronic devices such as mobile communications terminals, smartphones, table PCs, and the like.

A camera module is an optical device for capturing still or moving images. A camera module may include a lens, refracting light reflected from a subject, and a lens driving device moving the lens to adjust a focus or to compensate for the shaking of the camera module while images are captured.

Figure 2:
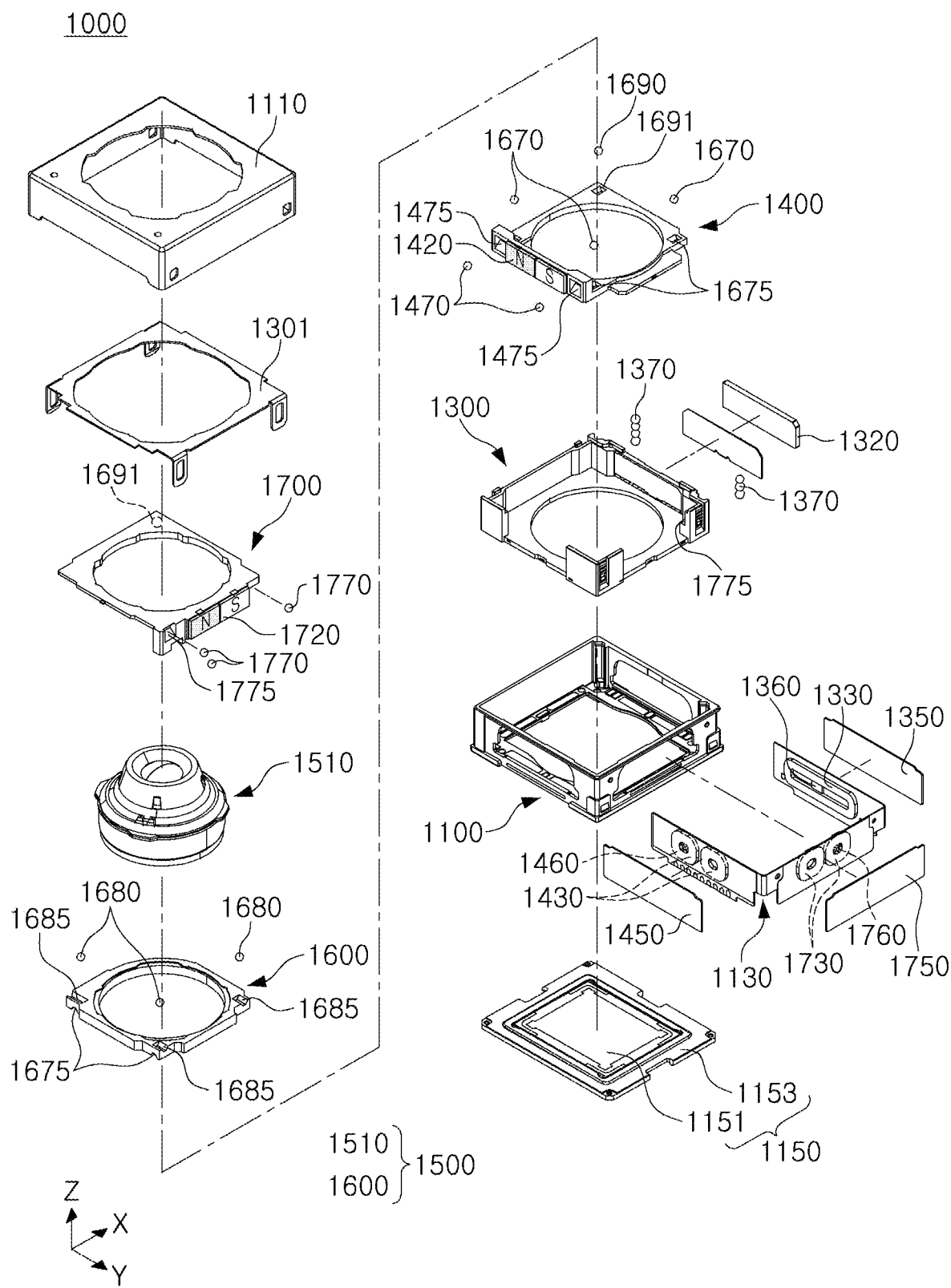
FIG. 2 is an exploded perspective view of a camera module according to an example.

FIG. 1 is an assembled perspective view of a camera module according to an example, and FIG. 2 is an exploded perspective view of a camera module according to an example.

Referring to FIGS. 1 and 2, a camera module 1000 may include a housing 1100, a lens module 1500 including a lens barrel 1510 accommodated in the housing 1100, a lens driving device moving the lens module 1500, and an image sensor unit 1150 converting light, incident through the lens barrel 1510, into an electrical signal. The camera module 1000 may further include a case 1110 or an upper cover 1301 covering the housing 1100 from above.

The lens barrel 1510 may be a hollow cylindrical shape allowing a plurality of lenses for capturing a subject to be accommodated therein (the configuration is not limited thereto, and the lens barrel 1510 may have a partially cut exterior, and the inside of the lens barrel 1510 may be provided with a circular lens or a D-cut lens, a lens having one side partially cut), and a plurality of lenses are mounted in the lens barrel 1510. The plurality of lenses is arranged as many as necessary depending on a design of the lens barrel 1510, and each of the plurality of lenses has the same or different optical characteristics such as a refractive index, or the like.

The lens driving device moves the lens barrel 1510 in an optical axis direction or a direction perpendicular to the optical axis direction.

As an example, the lens driving device may move the lens barrel 1510 in an optical axis direction (a Z-axis direction) to adjust a focus, and may move the lens barrel 1510 in X-axis and Y-axis directions, perpendicular to the optical axis direction (the Z-axis direction), to correct shaking at the time of capturing an image.

The lens driving device includes a focusing unit (an autofocusing part) and a shake correction unit (a shake correction portion).

The image sensor unit 1150 converts light, incident through the lens barrel 1510, into an electrical signal.

As an example, the image sensor unit 1150 may include an image sensor 1151 and a printed circuit board (PCB) 1153 connected to the image sensor 1151, and may further include an infrared filter.

The filter serves to block light in a predetermined area among light incident through the lens barrel 1510. For example, the filter may be an infrared filter, and may serve to block light in an infrared area.

The image sensor 1151 converts the light, incident through the lens barrel 1515, into an electrical signal. For example, the image sensor 1151 may be a charge-coupled device (CCD) or a complementary metal-oxide semiconductor (CMOS) image sensor.

The electrical signal, converted by the image sensor 1151, is output as an image through a display unit of a portable electronic device. The image sensor 1151 is fixed to the printed circuit board 1153 and may be electrically connected to the printed circuit board 1153 by wire bonding or the like.

The lens module 1500, including the lens barrel 1510, and the lens driving device are accommodated in the housing 1100.

As an example, the housing 1100 has a shape with an open top and bottom, and the lens module 1500 and the lens driving device may be accommodated in an internal space of the housing 1100. The image sensor unit 1150 is disposed below the housing 1100.

The case 1110 is coupled to the housing 1100 to surround an external surface of the housing 1100, and serves to protect internal components of the camera module 1000. In addition, the case 1110 may serve to shield electromagnetic waves.

As an example, the case 1110 may shield electromagnetic waves generated by the camera module 1000 such that electromagnetic waves do not affect other electronic components in the portable electronic device.

Since a portable electronic device is equipped with various electronic components other than the camera module, the case 1110 may shield electromagnetic waves generated by such electronic components such that the electromagnetic waves do not affect the camera module 1000.

Figure 3:
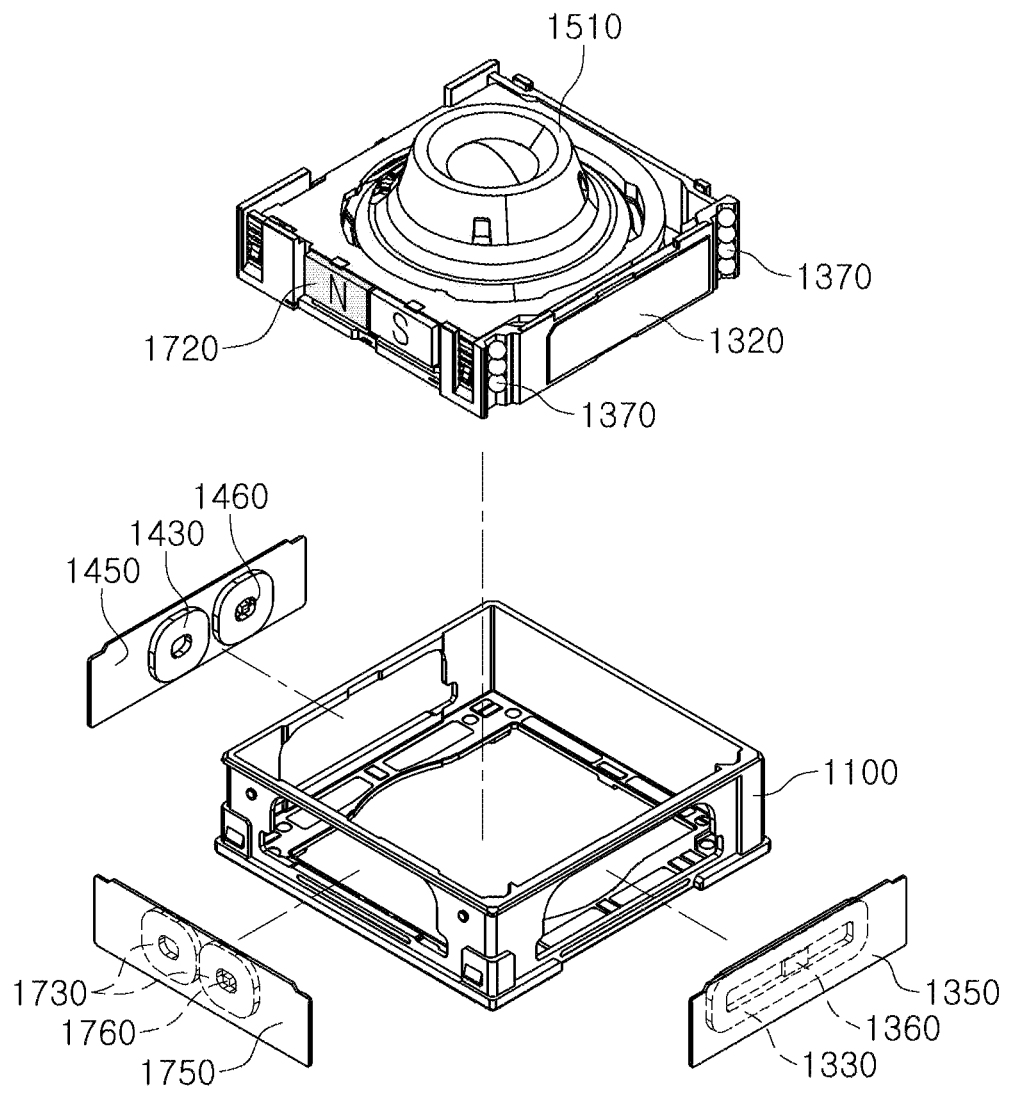
FIG. 3 is an exploded perspective view of a housing and a carrier according to an example.
Figure 4:
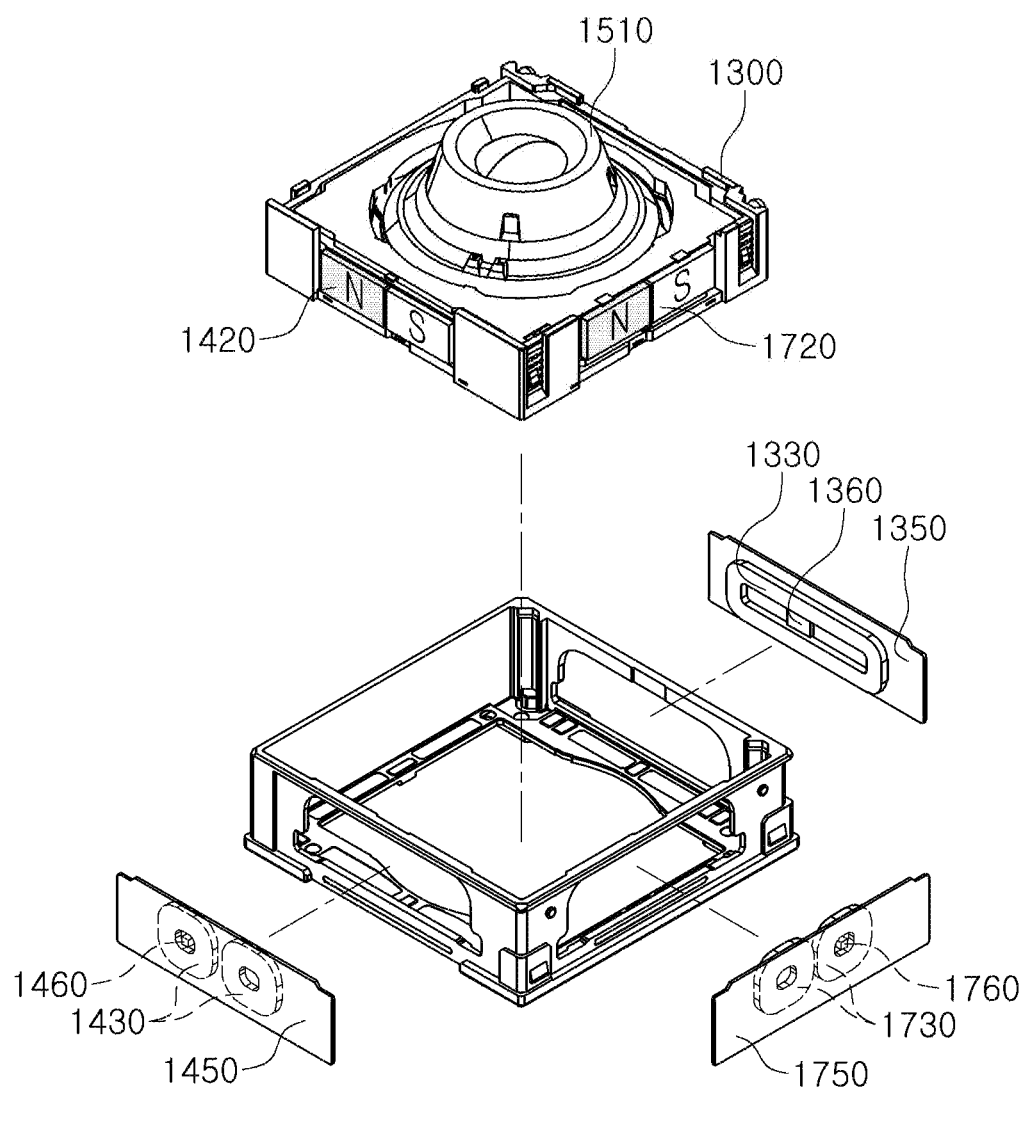
FIG. 4 is an exploded perspective view of a housing, a carrier, a frame, and a lens module according to an example.
Figure 5:
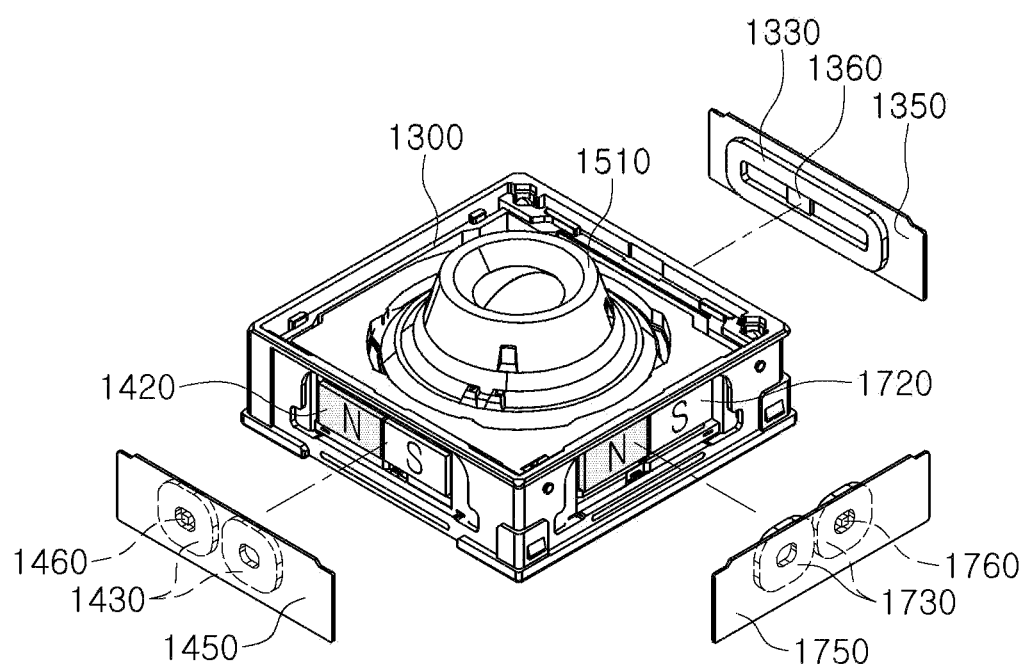
FIG. 5 is an assembled perspective view of a housing, a carrier, a frame, and a lens module according to an example.
Figure 6:
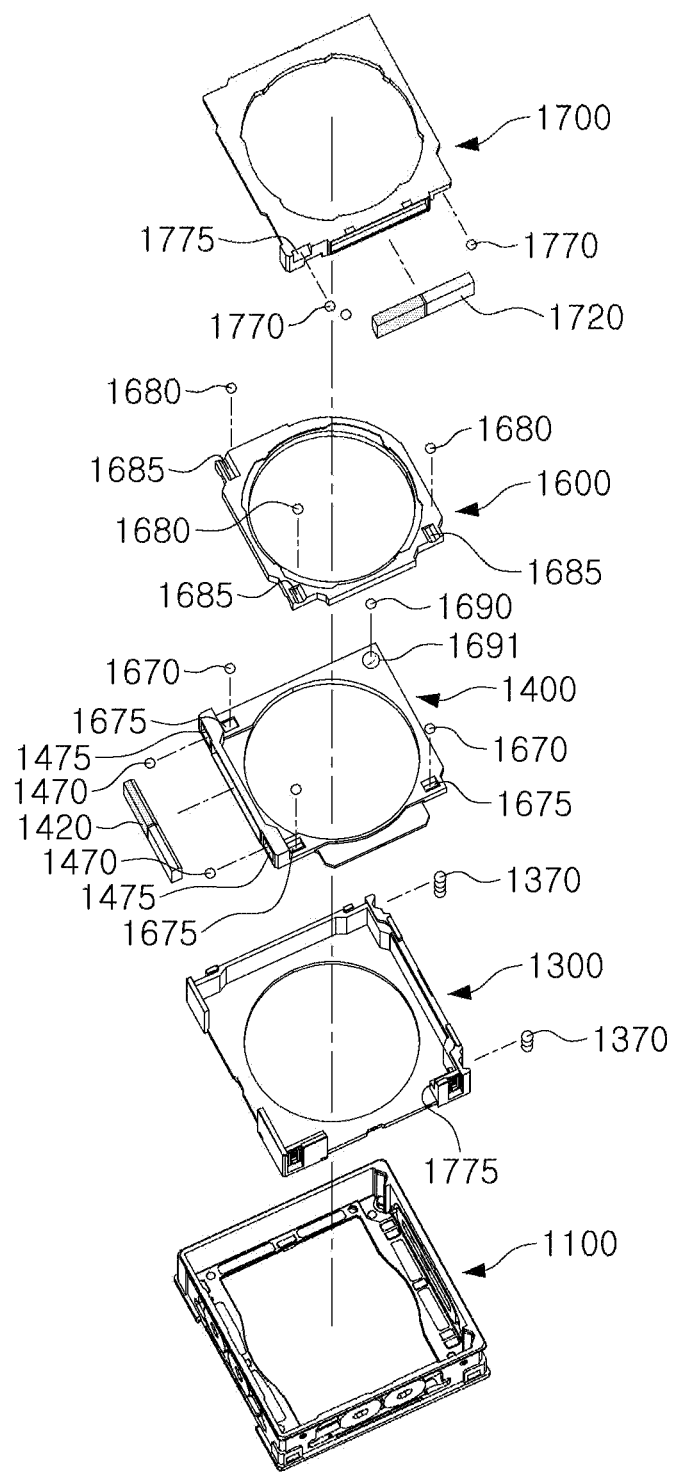
FIG. 6 is an exploded perspective view of a housing, a carrier, and a frame according to an example, when viewed from above.
Figure 7:
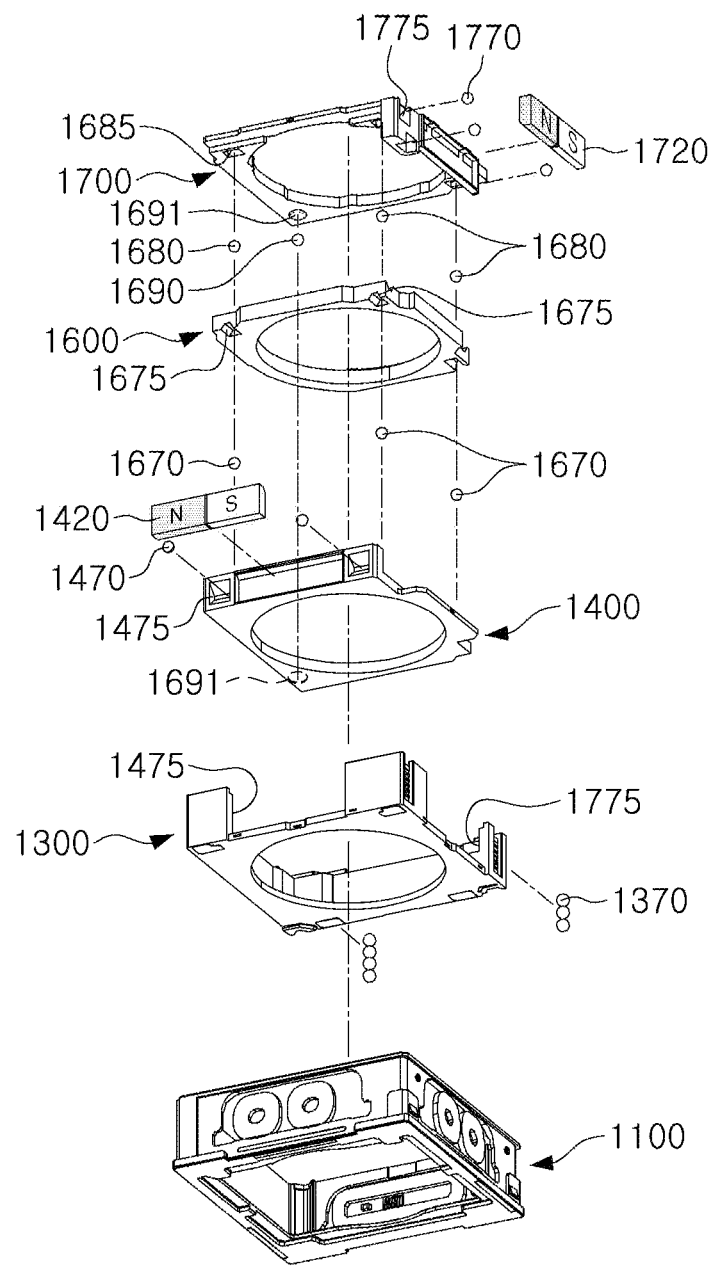
FIG. 7 is an exploded perspective view of a housing, a carrier, and a frame according to an example, when viewed from below.

Referring to FIGS. 2 to 4, the focusing unit of the lens driving device according to an example is illustrated.

The lens driving device includes a focusing unit, moving a carrier 1300 in an optical axis direction to perform autofocusing, and a shake correction unit moving the lens module disposed inside of the carrier 1300 in a direction perpendicular to the optical axis direction, to perform shake correction.

The focusing unit has a structure generating driving force to move the carrier 1300, accommodating the lens module 1500, in the optical axis direction (the Z-axis direction).

A driving portion of the focusing unit includes a magnet 1320 and a coil 1330. The magnet 1320 is mounted on the carrier 1300. As an example, the magnet 1320 may be mounted on one surface of the carrier 1300.

The coil 1330 is mounted in the housing 1100. As an example, the coil 1330 may be mounted in the housing 1100 through a substrate 1130. The coil 1330 may be fixed to the substrate 1130, and the substrate 1130 may be fixed to the housing 1100 in a state in which fixing driving coils of the shake correction unit to described later are also fixed together.

The magnet 1320 is a movable member mounted on the carrier 1300 to move in the optical axis direction (the Z-axis direction) together with the carrier 1300, and the coil 1330 is a fixed member fixed to the housing 1100. However, the configuration is not limited thereto, and positions of the magnet 1320 and the coil 1330 are interchangeable with each other.

When power is applied to the coil 1330, the carrier 1300 may be moved in the optical axis direction (the Z-axis direction) by electromagnetic interaction between the magnet 1320 and the coil 1330.

Since the lens barrel 1510 is accommodated in the carrier 1300, the lens barrel 1510 is also moved in the optical axis direction (the Z-axis direction) by the movement of the carrier 1300.

When the carrier 1300 is moved, a rolling member 1370 is disposed between the carrier 1300 and the housing 1100 to reduce friction between the carrier 1300 and the housing 1100. The rolling member 1370 may have a ball shape. The rolling members 1370 may be disposed on both sides of the magnet 1320.

A yoke 1350 is disposed in the housing 1100. For example, the yoke 1350 is disposed to oppose the magnet 1320 with the coil 1330 interposed therebetween. For example, the coil 1330 and the magnet 1320 are disposed to oppose each other, and the yoke 1350 is disposed on a rear surface of the coil 1330 such that the carrier 1300 is closely supported on the housing 1100 with the rolling member 1370 interposed therebetween.

Attractive force acts between the yoke 1350 and the magnet 1320 in a direction perpendicular to the optical axis direction (the Z-axis direction). Accordingly, the rolling member 1370 may be maintained in a state of contact with the carrier 1300 and the housing 1100 by the attractive force between the yoke 1350 and the magnet 1320.

The yoke 1350 may also serve to focus magnetic force of the magnet 1320, and may prevent magnetic flux from leaking outwardly.

The various examples discussed herein use a closed loop control method in which a position of the lens barrel 1510, and the carrier 1300, is detected and feed-backed.

Accordingly, a position sensor 1360 is required for closed loop control. The position sensor 1360 may be a hall sensor.

The position sensor 1360 is disposed inside or outside of the coil 1330. The position sensor 1360 may be mounted on the substrate 1130 on which the coil 1330 is mounted.

When the camera module 1000 is powered on, an initial position of the carrier 1300 is detected by the position sensor 1360. Then, the carrier 1300 is moved from the detected initial position to an initially set position. The term "initial position" may refer to a position of the carrier 1300 in an optical axis direction when the camera module 1000 is powered on, and the term "initially set position" may refer to a position at which a focus of the carrier 1300 is infinite. The carrier 1300 is moved from the initially set position to a target position by a driving signal of a circuit element. During a focusing process, the carrier 1300 may be moved forward and backward in the optical axis direction (the Z-axis direction) (for example, bi-directionally).

A magnet and a coil may be additionally provided to secure sufficient driving force during focusing. When an area, in which a magnet is mounted, is reduced with the trend for slimming of a camera module, a size of the magnet is decreased, and thus, sufficient driving force required for focusing may not be secured.

According to the various examples, although not illustrated, magnets may be respectively attached to the different surfaces of the carrier 1300 and coils may be respectively provided on different surfaces of the housing 1100 to oppose the magnet. Thus, sufficient driving force for focusing may be secured even when a camera module is slimmed.

Referring to FIGS. 2 to 7, a shake correction unit of the lens driving device according to an example is disclosed.

The lens driving device includes a focusing unit, moving the carrier 1300 in an optical axis direction to perform focusing, and a shake correction unit moving the lens module 1500 disposed inside of the carrier 1300 in a direction perpendicular to the optical axis direction, to perform shake correction.

The shake correction unit has a structure generating driving force to moves the lens module 1500, accommodated in the carrier 1300, in a first direction (an X-axis direction) and a second direction (a Y-axis direction), both perpendicular to the optical axis direction (the Z-axis direction).

The shake correction unit is used to correct image blurring or video shaking caused by user hand-shake, or the like, when an image or a video is captured. For example, when the shake occurs due to user hand-shake, or the like, at the time of capturing an image, a relative displacement corresponding to the shake is provided to the lens barrel 1510 to correct the shaking. As an example, the shake correction unit corrects the shaking by moving the lens barrel 1510 in a direction perpendicular to an optical axis (a Z axis).

The shake correction unit may include a first frame 1400, the lens module 1500, and a second frame 1700 sequentially provided inside of the carrier 1300. The lens module 1500 includes a lens holder 1600 to which the lens barrel 1510 is coupled. The first frame 1400 and the second frame 1700 may be supported with a rolling member interposed between surfaces thereof parallel to the optical axis direction of the carrier 1300. The carrier 1300 may include the upper cover 1301 covering the first frame 1400, the lens module 1500, and the second frame 1700 from above while they are disposed inside of the carrier 1300.

A rolling member may be interposed between the first frame 1400, the lens holder 1600, and the second frame 1700, sequentially provided in the optical axis direction, such that they may mutually move in a rolling motion.

The shake correction unit according to this example may implement a structure in which the lens barrel 1510 may be moved as the first frame 1400 and the second frame 1700 are moved in the second direction (the Y-axis direction) and the first direction (the X-axis direction), respectively.

For example, the lens module 1500 including the lens barrel 1510 should be moved as the first frame 1400 is moved in the second direction (the Y-axis direction) or the second frame 1700 is moved in the first direction (the X-axis direction).

Accordingly, the lens holder 1600, to which the lens barrel 1510 is coupled, may be provided with a guide groove 1675 formed on at least one of a lower surface of the lens holder 1600 and an upper surface of the first frame 1400 to be elongated in the first direction (the X-axis direction) such that a rolling member 1670 disposed between the lens holder 1600 and the first frame 1400 may be freely moved in a rolling motion in the first direction (the X-axis direction), a direction in which the second frame 1700 is moved. When the lower surface of the lens holder 1600 and the upper surface of the first frame 1400 are respectively provided with guide grooves 1675, the guide grooves 1675 may be provided as ']' or '⌊'-shaped grooves formed on edge portions of the lower surface of the lens holder 1600 and the upper surface of the first frame 1400, respectively. The guide grooves 1675 may be vertically coupled to each other to prevent separation of the rolling member 1670.

Similarly, a guide groove 1685 is formed on at least one of an upper surface of the lens holder 1600 and a lower surface of the second frame 1700 to be elongated in the second direction (the Y-axis direction) such that a rolling member 1680 disposed between the lens holder 1600 and the second frame 1700 may be freely moved in a rolling motion in the second direction (the Y-axis direction), a direction in which the first frame 1400 is moved. When the upper surface of the lens holder 1600 and the lower surface of the second frame 1700 are respectively provided with guide grooves 1685, the guide grooves 1685 may be provided as ']' or '⌊'-shaped grooves formed on edge portions of the upper surface of the lens holder 1600 and the lower surface of the second frame 1700, respectively. The guide grooves 1685 may be vertically coupled to each other to prevent separation of the rolling member 1680.

Due to the above structure, the lens module 1500 is also moved when the first frame 1400 is moved in the second direction (the Y-axis direction) or the second frame 1700 is move in the first direction (the X-axis direction), and thus, shake may be corrected.

Each of the rolling members 1670 and 1680 may be provided with three rolling members to form a triangle (the configuration is not limited thereto, each of the rolling members 1670 and 1680 may be provided with four rolling member). As a first magnet 1420 and a second magnet 1720, to be described later, are disposed to be adjacent to each other, the rolling members 1670 and 1680 may be provided on both end portions of the first magnet 1420 and the second magnet 1720, respectively. When each of the rolling members 1670 and 1680 are provided with three rolling member, an auxiliary rolling member 1690 may be provided between opposing surfaces in the optical axis direction of the first frame 1400 and the second frame 1700. As such, at least one of the opposing surfaces of the first frame 1400 and the second frame 1700 may be provided with a guide groove 1691 in which the auxiliary rolling member 1690 is seated.

The driving portion of the shake correction unit includes a first driving portion, driving the first frame 1400, and a second driving portion driving the second frame 1700. The first frame 1400 and the second frame 1700 are driven while being in closely supported on a surface parallel to the optical axis direction of the carrier 1300.

The first frame 1400 is provided with the first magnet 1420. The first magnet 1420 is disposed to oppose a first coil 1430, provided in the housing 1100, in the first direction (the X-axis direction) perpendicular to the optical axis direction.

The first magnet 1420 is magnetized to have at least N and S poles in a second direction (a Y-axis direction) perpendicular to a direction opposing the first coil 1430 (for example, the first magnet 1420 is magnetized such that a surface opposing the first coil 1430 has at least N and S poles in a direction perpendicular to the optical axis). Accordingly, when power is applied to the first coil 1430, force is generated to move the first frame 1400 in the second direction (the Y-axis direction) depending on electromagnetic interaction of the first magnet 1420 and the first coil 1430.

The second frame 1700 is provided with the second magnet 1720. The second magnet 1720 is disposed to oppose a second coil 1730, provided in the housing 1100, in the second direction (the Y-axis direction) perpendicular to the optical axis direction and the first direction (the X-axis direction).

The second magnet 1720 is magnetized to have at least N and S poles in the first direction (the X-axis direction) perpendicular to a direction opposing the second coil 1730 (for example, the second magnet 1720 is magnetized such that a surface opposing the second coil 1730 has at least N and S poles in a direction perpendicular to the optical axis). Accordingly, when power is applied to the second coil 1730, force is generated to move the second frame 1700 in the first direction (the X-axis direction) depending on electromagnetic interaction of the second magnet 1720 and the second coil 1730.

The first coil 1430 and the second coil 1730 may be fixed to the substrate 1130 together with the driving coil 1330 of the focusing unit, and the substrate 1130 may be fixed to the housing 1100. Each of the first coil 1430 and the second coil 1730 may be provided with one or two or more coils.

The first frame 1400 and the second frame 1700 are closely supported on a sidewall of the carrier 1300, for example, a surface of the carrier 1300 parallel to the optical axis direction. The first frame 1400 and the second frame 1700 are supported on the sidewall of the carrier 1300 by attractive force with a first yoke 1450 and a second yoke 1750 provided in the housing 1100. Since each of the first yoke 1450 and the second yoke 1750 may be a metallic or non-metallic magnetic material to shield a magnetic field, magnetic flux (a magnetic field) generated by a coil, a magnet, or an interface thereof may be prevented from leaking outwardly of the camera module 1000.

The first yoke 1450 is disposed to oppose the first magnet 1420 with the first coil 1430 interposed therebetween, and the second yoke 1750 is disposed to oppose the second magnet 1720 with the second coil 1730 interposed therebetween.

For example, the first yoke 1450 and the second yoke 1750 may be disposed on rear surfaces of the first coil 1430 and the second coil 1730, respectively. The first yoke 1450 and the second yoke 1750 may allow the first frame 1400 and the second frame 1700 to be closely supported on an internal wall of the carrier 1300 by the attractive force with the first magnet 1420 and the second magnet 1720, respectively.

The first frame 1400 and the second frame 1700 may include a first rolling member 1470 and a second rolling member 1770 disposed between the first and second frames 1400 and 1700 and the internal wall of the carrier 1300 to easily move in a sliding or rolling motion on the internal wall of the carrier 1300, respectively.

A surface, on which the internal walls of the first frame 1400 and the carrier 1300 oppose each other, may be provided with a first guide groove 1475 formed to be elongated in the second direction (the Y-axis direction) such that the first rolling member 1470 is easily moved in a sliding or rolling motion. A surface, on which the internal walls of the second frame 1700 and the carrier 1300 oppose each other, may be provided with a second guide groove 1775 formed to be elongated in the first direction (the X-axis direction) such that the second rolling member 1770 is easily moved in a sliding or rolling motion.

The first rolling member 1470 and the second rolling member 1770 may be provided with two first magnets 1420 and two second magnets 1720 on external sides of both end portions thereof, respectively (the configuration is not limited thereto, and the first rolling member 1470 and the second rolling member 1770 may be provided with three or more first magnets 1420 and three or more second magnets 1720, respectively).

The first guide groove 1475 may be formed such that the movement of the first rolling member 1470 is limited only in the first direction (the X-axis direction), a direction in which the first frame 1400 is supported, and the movement or tilting of the first rolling member 1470 is not limited in the optical axis direction (the Z-axis direction) and the second direction (the Y-axis direction). For example, in addition to the movement of the first frame 1400 in the second direction (the Y-axis direction), the first frame 1400 may be tilted based on a shaft connecting the two first rolling members 1470 provided on both sides, or the first guide groove 1475 may be provided to have a width greater than a width of the first rolling member 1470 in all directions such that the rolling motion of the first rolling member 1470 is not limited (a depth of the first guide groove 1475 should be constantly maintained because the movement thereof is limited in the first direction (the X-axis direction)).

The second guide groove 1775 may be formed such that the movement of the second rolling member 1770 is limited only in the second direction (the Y-axis direction), a direction in which the second frame 1700 is supported, and the movement of the second rolling member 1770 is not limited in the optical axis direction (the Z-axis direction) and the first direction (the X-axis direction). For example, in addition to the movement of the second frame 1700 in the first direction (the X-axis direction), the second frame 1700 may be tilted based on a shaft connecting the two second rolling members 1770 provided on both sides, or the second guide groove 1775 may be provided to have a width greater than a width of the second rolling member 1770 in all directions such that the rolling motion of the second rolling member 1770 is not limited (a depth of the second guide groove 1775 should be constantly maintained because the movement thereof is limited in the second direction (the Y-axis direction)).

The first and second magnets 1420 and 1720 of the shake correction driving unit including the first driving unit and the second driving unit are mounted on the first and second frames 1400 and 1700, respectively. The first and second coils 1430 and 1730, respectively opposing the first and second magnets 1420 and 1720, are mounted in the housing 1100. For ease of description, in a portion of the drawings, the first and second coils 1430 and 1730 are illustrated as being disposed on a side of the carrier 1300. However, referring to FIG. 2, both of the first and second coils 1430 and 1730 may be mounted in the housing 1100.

The first and second magnets 1420 and 1720 are movable members moved together with the lens module 1500 in a direction perpendicular to the optical axis (the Z-axis), and the first and second coils 1430 and 1730 are fixed members fixed to the housing 1100. However, the configuration is not limited thereto, and positions of the first and second magnets 1420 and 1720 and the first and second coils 1430 and 1730 are interchangeable with each other.

The shake correction driving unit may use a closed loop control method in which the positions of the first and second frames 1400 and 1700 are continuously sensed and reflected on driving. Accordingly, the first and second frames 1400 and 1700 may include first and second position sensors 1460 and 1760, opposing the first and second magnets 1420 and 1720, to sense the positions of the first and second frames 1400 and 1700. In this case, the first and second position sensors 1460 and 1760 may be provided inside or by the first and second coils 1430 and 1730 of the substrate 1130.

This example includes all structures in which one or two or more first and second coils 1430 and 1730, opposing the first and second magnets 1420 and 1720 provided on the first and second frames 1400 and 1700, are provided, respectively. When two or more first and second coils 1430 and 1730 are provided, the amount of magnetic flux may be adjusted to more efficiently prevent leakage of the magnetic flux.

In the camera module 1000 according to this example, side surfaces of the housing 1100 using a VCM actuator using a magnet and a coil may all be finished with a yoke, capable of preventing leakage of magnetic flux. As a result, leakage of a magnetic field may be effectively prevented.

Figure 8:
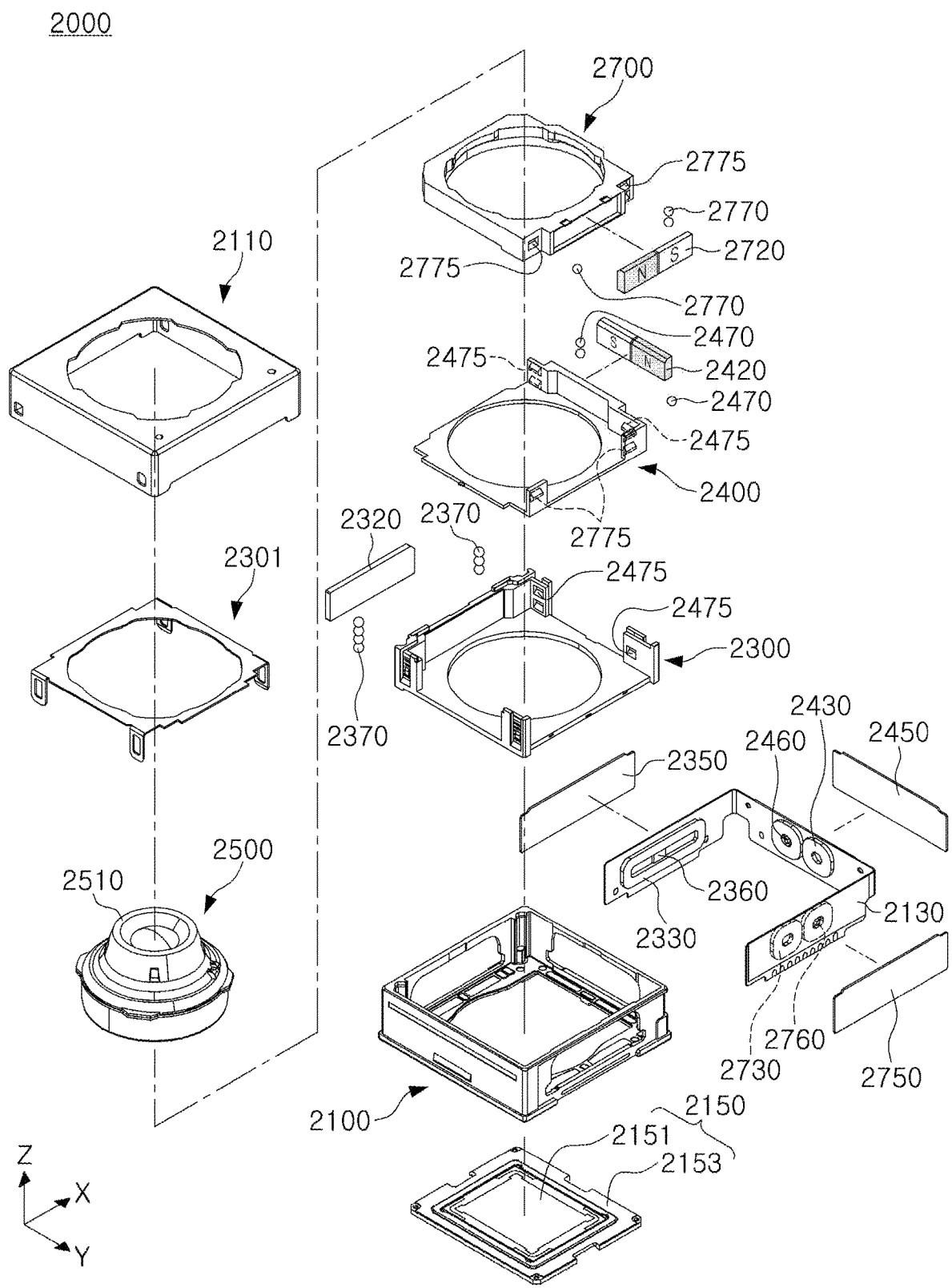
FIG. 8 is an exploded perspective view of a camera module according to another example.
Figure 9:
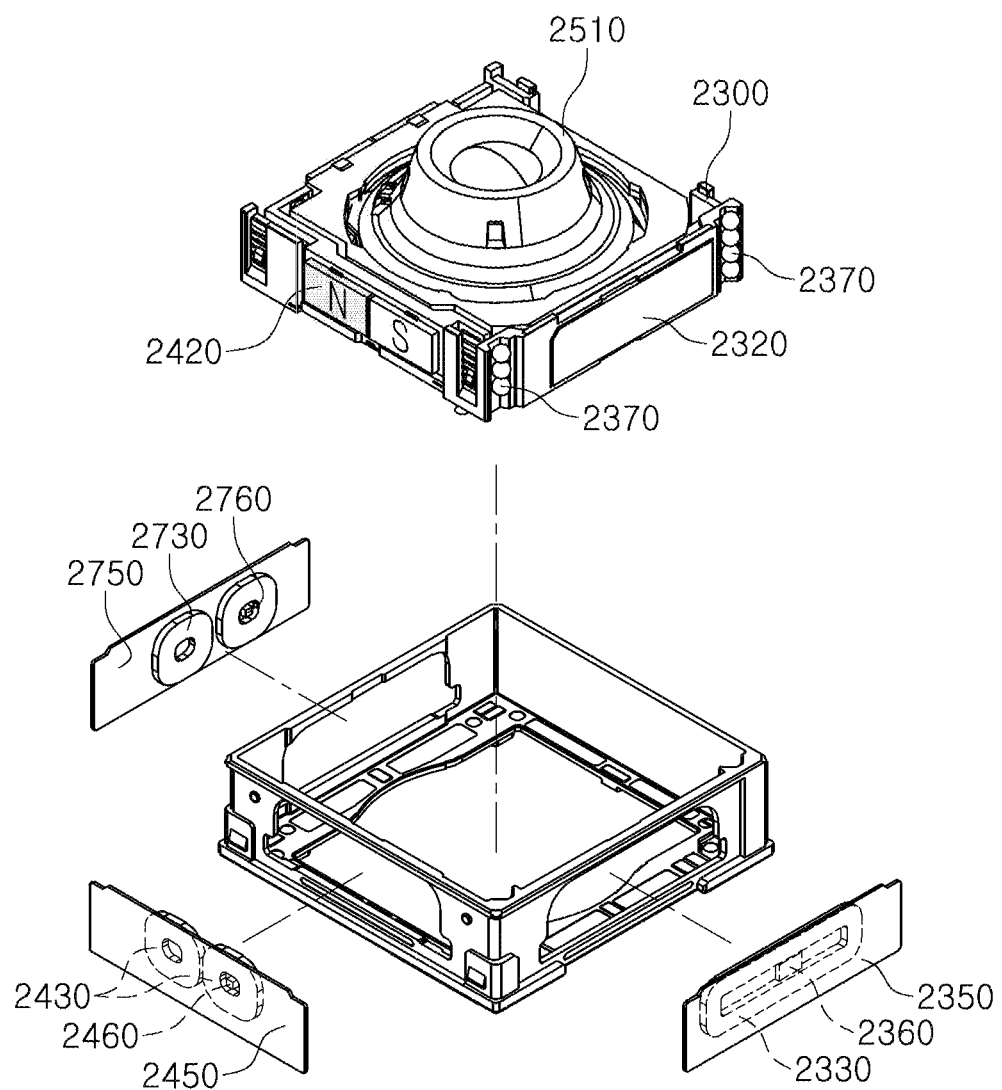
FIG. 9 is an exploded perspective view of a housing and a carrier according to another example.
Figure 10:
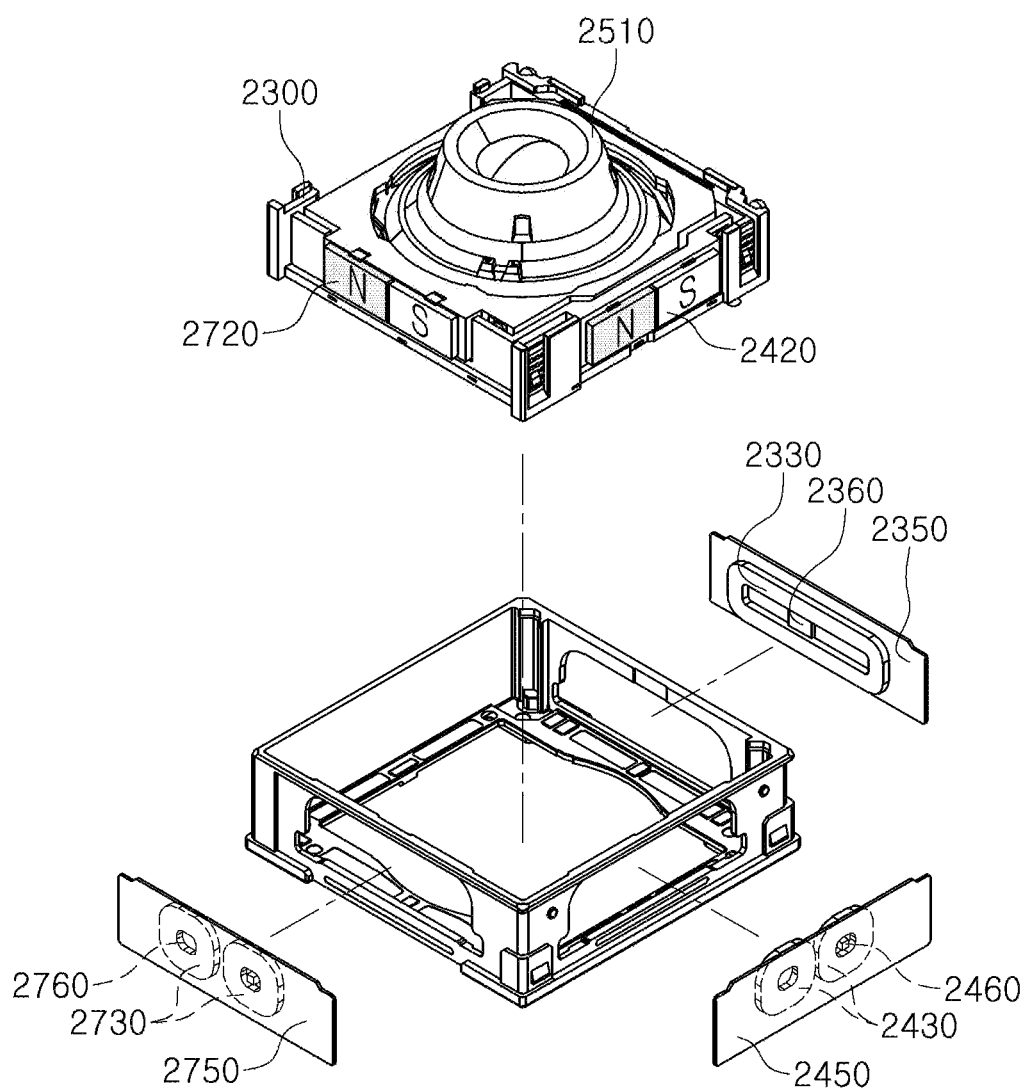
FIG. 10 is an exploded perspective view of a housing, a carrier, a frame, and a lens module according to another example.
Figure 11:
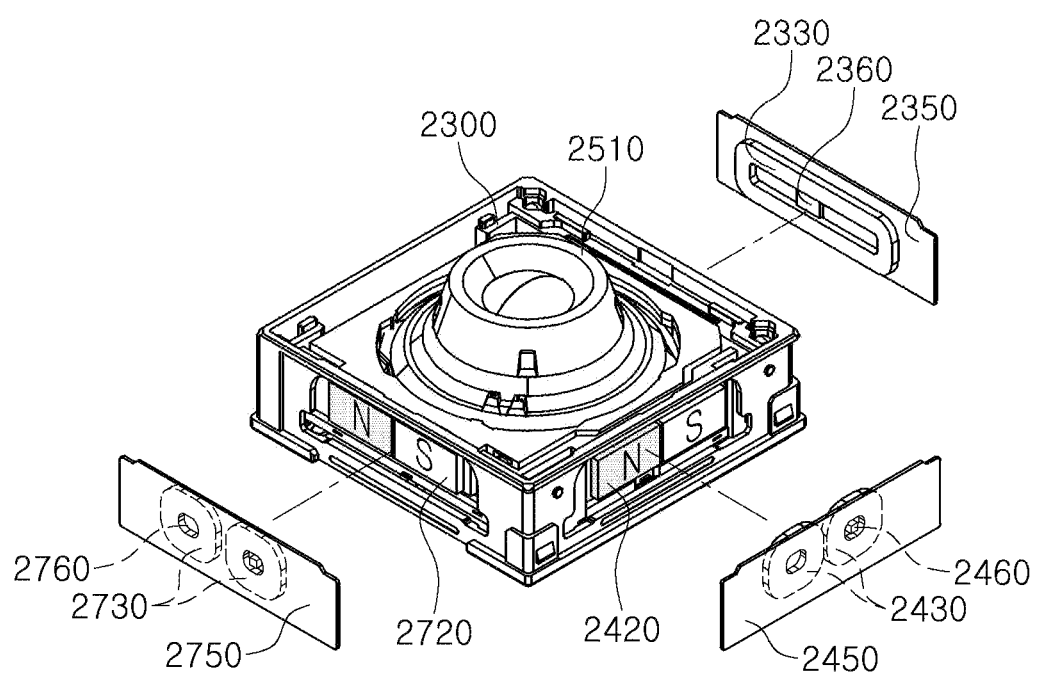
FIG. 11 is an assembled perspective view of a housing, a carrier, a frame, and a lens module according to another example.
Figure 12:
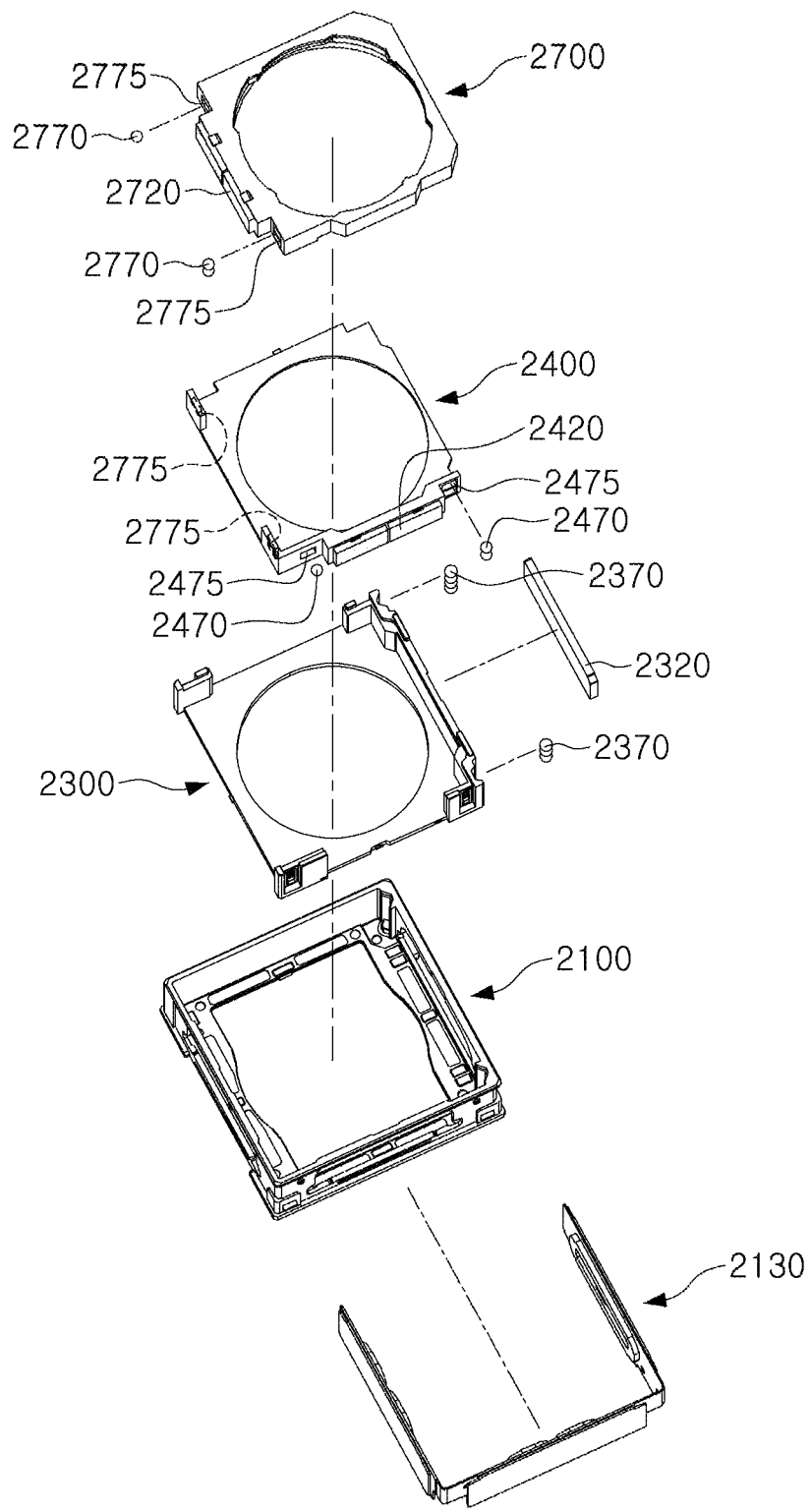
FIG. 12 is an exploded perspective view of a housing, a carrier, a frame, and a lens holder according to another example, when viewed from above.
Figure 13:
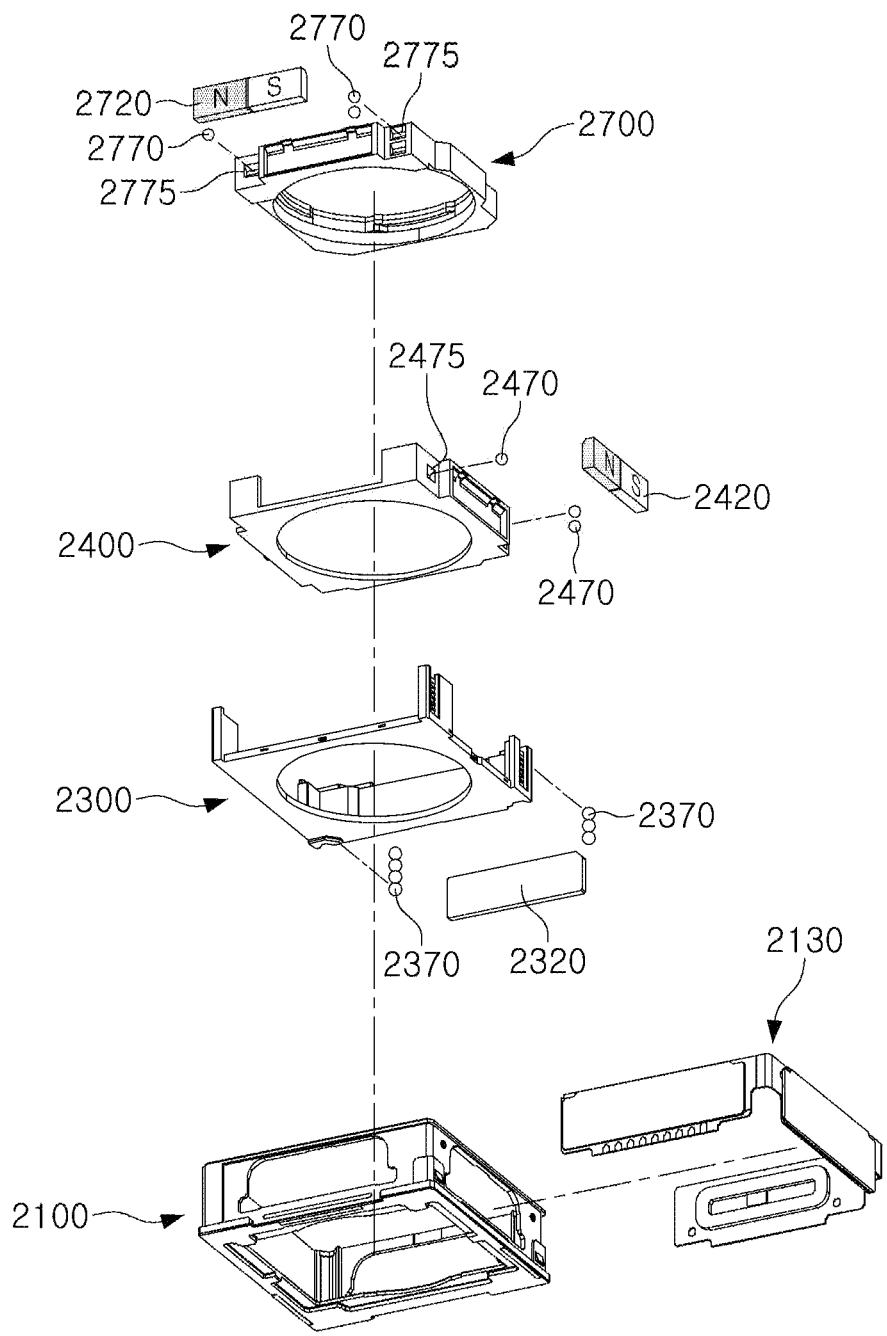
FIG. 13 is an exploded perspective view of a housing, a carrier, a frame, and a lens holder according to another example, when viewed from below.

FIG. 1 is an assembled exploded perspective view of a camera module according to another example, and FIG. 8 is an exploded perspective view of the camera module according to another example.

Referring to FIGS. 1 and 8, a camera module 2000 includes a housing 2100, a lens module 2500 including a lens barrel 2510 accommodated in the housing 2100, a lens driving device moving the lens module 2500, and an image sensor unit 2150 converting light, incident through the lens barrel 2510, into an electrical signal. The camera module 2000 may further include a case 2110 or an upper cover 2301 covering the housing 2100 from above.

The lens barrel 2510 may have a hollow cylindrical shape allowing a plurality of lenses for capturing a subject to be accommodated therein (the configuration is not limited thereto, and the lens barrel 2510 may have a partially cut exterior, and the inside of the lens barrel 2510 may be provided with a circular lens or a D-cut lens which is a lens having one side partially cut), and a plurality of lenses are mounted in the lens barrel 2510. The plurality of lenses is arranged in as large a number as necessary, depending on a design of the lens barrel 2510, and each of the plurality of lenses has the same or different optical characteristics such as refractive index, or the like.

The lens driving device moves the lens barrel 2510 in an optical axis direction or a direction perpendicular to the optical axis direction.

As an example, the lens driving device may move the lens barrel 2510 in an optical axis direction (a Z-axis direction) to adjust a focus, and may move the lens barrel 2510 in X-axis and Y-axis directions, perpendicular to the optical axis direction (the Z-axis direction), to correct shaking at the time of capturing an image.

The lens driving device includes a focusing unit (an autofocusing part) and a shake correction unit (a shake correction portion).

The image sensor unit 2150 converts light, incident through the lens barrel 2510, into an electrical signal.

As an example, the image sensor unit 2150 may include an image sensor 2151 and a printed circuit board (PCB) 2153 connected to the image sensor 2151, and may further include an infrared filter.

The lens module 2500, including the lens barrel 2510, and the lens driving device are accommodated in the housing 2100.

As an example, the housing 2100 has a shape with an open top and bottom, and the lens module 2500 and the lens driving device may be accommodated in an internal space of the housing 2100. The image sensor unit 2150 is disposed below the housing 2100.

The case 2110 is coupled to the housing 2100 to surround an external surface of the housing 2100, and serves to protect internal components of the camera module 2000. The case 2110 may serve to shield electromagnetic waves.

As an example, the case 2110 may shield electromagnetic waves generated by the camera module 2000 such that electromagnetic waves do not affect other electronic components in the portable electronic device.

Since a portable electronic device is equipped with various electronic components other than the camera module 2000, the case 2110 may shield electromagnetic waves generated by such electronic components such that the electromagnetic waves do not affect the camera module.

Referring to FIGS. 8 to 13, a focusing unit of the lens driving device according to another example is illustrated.

The lens driving device includes a focusing unit, moving a carrier 2300 in an optical axis direction to perform autofocusing, and a shake correction unit moving the lens module 2500 disposed inside of the carrier 2300 in a direction perpendicular to the optical axis direction, to perform shake correction.

The focusing unit has a structure generating driving force to move the carrier 2300, accommodating the lens module 2500, in the optical axis direction (the Z-axis direction).

A driving portion of the focusing unit includes a magnet 2320 and a coil 2330. The magnet 2320 is mounted on the carrier 2300. As an example, the magnet 2320 may be mounted on one surface of the carrier 2300.

The coil 2330 is mounted in the housing 2100. As an example, the coil 2330 may be mounted in the housing 2100 through a substrate 2130. The coil 2330 may be fixed to the substrate 2130, and the substrate 2130 may be fixed to the housing 2100 in a state in which fixing driving coils of the shake correction unit, to described later, are also fixed together.

The magnet 2320 is a movable member mounted on the carrier 2300 to move in the optical axis direction (the Z-axis direction) together with the carrier 2300, and the coil 2330 is a fixed member fixed to the housing 2100. However, the configuration is not limited thereto, and positions of the magnet 2320 and the coil 2330 are interchangeable with each other.

When power is applied to the coil 2330, the carrier 2300 may be moved in the optical axis direction (the Z-axis direction) by electromagnetic interaction between the magnet 2320 and the coil 2330.

Since the lens barrel 2510 is accommodated in the carrier 2300, the lens barrel 2510 is also moved in the optical axis direction (the Z-axis direction) by the movement of the carrier 2300.

When the carrier 2300 is moved, a rolling member 2370 is disposed between the carrier 2300 and the housing 2100 to reduce friction between the carrier 2300 and the housing 2100. The rolling member 2370 may have a ball shape. The rolling members 2370 may be disposed on both sides of the magnet 2320.

A yoke 2350 is disposed in the housing 2100. For example, the yoke 2350 is disposed to oppose the magnet 2320 with the coil 2330 interposed therebetween. For example, the coil 2330 and the magnet 2320 are disposed to oppose each other, and the yoke 2350 is disposed on a rear surface of the coil 2330 such that the carrier 2300 is closely supported on the housing 2100 with the rolling member 2370 interposed therebetween.

An attractive force acts between the yoke 2350 and the magnet 2320 in a direction perpendicular to the optical axis direction (the Z-axis direction). Accordingly, the rolling member 2370 may be maintained in a state of contact with the carrier 2300 and the housing 2100 by the attractive force between the yoke 2350 and the magnet 2320.

The yoke 2350 may also serve to focus magnetic force of the magnet 2320, and may prevent magnetic flux from leaking outwardly.

The various examples use a closed loop control method in which a position of the lens barrel 2510, and the carrier 2300, is detected and feed-backed.

Accordingly, a position sensor 2360 is required for closed loop control. The position sensor 2360 may be a hall sensor.

The position sensor 2360 is disposed inside or outside of the coil 2330. The position sensor 2360 may be mounted on the substrate 2130 on which the coil 2330 is mounted.

A magnet and a coil may be additionally provided to secure sufficient driving force during focusing. When an area, in which a magnet is mounted, is reduced with the trend for slimming of a camera module, a size of the magnet is decreased, and thus, sufficient driving force required for focusing may not be secured.

According to the various examples, although not illustrated, magnets may be respectively attached to the different surface of the carrier 2300 and coils may be respectively provided on different surfaces of the housing 2100 to oppose the magnet. Thus, sufficient driving force for focusing may be secured even when a camera module is slimmed.

Referring to FIGS. 8 to 13, a shake correction unit of the lens driving device according to an example is disclosed.

The lens driving device includes a focusing unit, moving the carrier 2300 in an optical axis direction to perform focusing, and a shake correction unit moving the lens module 2500 disposed inside of the carrier 2300 in a direction perpendicular to the optical axis direction, to perform shake correction.

The shake correction unit has a structure generating driving force to move the lens module 2500, accommodated in the carrier 2300, in a first direction (an X-axis direction) and a second direction (a Y-axis direction), perpendicular to the optical axis direction (the Z-axis direction).

The shake correction unit is used to correct image blurring or video shaking caused by user hand-shake, or the like, when an image or a video is captured. For example, when the shake occurs due to user hand-shake, or the like, at the time of capturing an image, a relative displacement corresponding to the shake is provided to the lens barrel 2510 to correct the shaking. As an example, the shake correction unit corrects the shaking by moving the lens barrel 2510 in a direction perpendicular to an optical axis (a Z axis).

The shake correction unit may include a frame 2400 and the lens module 2500 sequentially provided inside of the carrier 2300. The lens module 2500 includes a lens holder 2700 to which the lens barrel 2510 is coupled. The carrier 2300 may include the upper cover 2301 covering the frame 2400 and the lens module 2500 from above while they are disposed inside of the carrier 2300.

The shake correction unit according to this example may implement a structure in which the lens barrel 2510 may be moved as the frame 2400 and the lens holder 2700 are moved in the second direction (the Y-axis direction) and the first direction (the X-axis direction), respectively.

For example, the lens holder 2700, to which the lens barrel 2510 is fixed, is moved when the frame 2400 is moved in the second direction (the Y-axis direction) or the lens holder 2700 is moved in the first direction (the X-axis direction). For example, the lens barrel 2510 is moved with the movement of the lens holder 2700 because the lens barrel 2510 is fixed to the lens holder 2700, and is moved together with the frame 2400 even when the frame 2400 is moved because the lens holder 2700 is a member moved while being supported on a side surface of the frame 2400.

Due to the above structure, the lens barrel 2510 is also moved when the frame 2400 is moved in the second direction (the Y-axis direction) or the lens holder 2700 is moved in the first direction (the X-axis direction), and thus, shake may be corrected.

A driving portion of the shake correction unit includes a first driving portion, driving the frame 2400, and a second driving portion driving the lens holder 2700. The frame 2400 is driven while being closely supported on a surface parallel to an optical axis direction of the carrier 2300, and the lens holder 2700 is driven while being closely supported on a surface parallel to an optical axis direction of the frame 2400.

The frame 2400 includes a first magnet 2420. The first magnet 2420 is disposed to oppose a first coil 2430, provided in the housing 2100, in the first direction (the X-axis direction) perpendicular to the optical axis direction.

The first magnet 2420 is magnetized to have at least N and S poles in a second direction (a Y-axis direction) perpendicular to a direction opposing the first coil 2430 (for example, the first magnet 2420 is magnetized such that a surface opposing the first coil 2430 has at least N and S poles in a direction perpendicular to the optical axis). Accordingly, when power is applied to the first coil 2430, force is generated to move the frame 2400 in the second direction (the Y-axis direction) depending on electromagnetic interaction of the first magnet 2420 and the first coil 2430.

The lens holder 2700 is provided with a second magnet 2720. The second magnet 2720 is disposed to oppose a second coil 2730, provided in the housing 2100, in the second direction (the Y-axis direction) perpendicular to the optical axis direction and the first direction (the X-axis direction).

The second magnet 2720 is magnetized to have at least N and S poles in the first direction (the X-axis direction) perpendicular to a direction opposing the second coil 2730 (for example, the second magnet 2720 is magnetized such that a surface opposing the second coil 2730 has at least N and S poles in a direction perpendicular to the optical axis). Accordingly, when power is applied to the second coil 2730, force is generated to move the lens holder 2700 in the first direction (the X-axis direction) depending on electromagnetic interaction of the second magnet 2720 and the second coil 2730.

The first coil 2430 and the second coil 2730 may be fixed to the substrate 2130 together with the driving coil 2330 of the focusing unit, and the substrate 2130 may be fixed to the housing 2100.

The frame 2400 is closely supported on a sidewall of the carrier 2300, for example, a surface of the carrier 2300 parallel to the optical axis direction. The lens holder 2700 is closely supported on a sidewall of the frame 2400, for example, a surface of the frame 2400 parallel to the optical axis direction.

The frame 2400 and the lens holder 2700 are supported on sidewalls of the carrier 2300 and the frame 2400 by attractive force with a first yoke 2450 and a second yoke 2750 provided in the housing 2100. Since each of the first yoke 2450 and the second yoke 2750 may be a metallic or non-metallic magnetic material to shield a magnetic field, magnetic flux (a magnetic field) generated by a coil, a magnet, or an interface thereof may be prevented from leaking outwardly of the camera module 2000.

The first yoke 2450 is disposed to oppose the first magnet 2420 with the first coil 2430 interposed therebetween, and the second yoke 2750 is disposed to oppose the second magnet 2720 with the second coil 2730 interposed therebetween.

The first yoke 2450 and the second yoke 2750 may be disposed on rear surfaces of the first coil 2430 and the second coil 2730, respectively. The first yoke 2450 and the second yoke 2750 may allow the first frame 2400 and the lens holder 2700 to be closely supported on internal walls of the carrier 2300 and the frame 2400 by the attractive force with the first magnet 2420 and the second magnet 2720, respectively.

The frame 2400 may include a first rolling member 2470 between the internal wall of the carrier 2300 and the frame 2400 to be easily moved in a sliding or rolling motion. The lens holder 2700 may include a second rolling member 2770 between the internal wall of the frame 2400 and the lens holder 2700 to be easily moved in a sliding or rolling motion.

A surface, on which the internal walls of the frame 2400 and the carrier 2300 oppose each other, may be provided with a first guide groove 2475 formed to be elongated in the second direction (the Y-axis direction) such that the first rolling member 2470 is easily moved in a sliding or rolling motion on at least one of the surfaces. A surface, on which the internal walls of the lens holder 2700 and the carrier 2300 oppose each other, may be provided with a second guide groove 2775 formed to be elongated in the first direction (the X-axis direction) such that the second rolling member 2770 is easily moved in a sliding or rolling motion on at least one of the surfaces.

The first rolling member 2470 and the second rolling member 2770 may be provided with one or two first magnets 2420 and one or two second magnets 2720 on external sides of both end portions thereof, respectively, to form a triangle or a quadrangle. Each rolling member may be provided with one rolling member in each guide groove.

The first and second magnets 2420 and 2720 of the shake correction driving unit including the first driving unit and the second driving unit are mounted on the first frame 2400 and the lens holder 2700, respectively. The first and second coils 2430 and 2730, respectively opposing the first and second magnets 2420 and 2720, are mounted in the housing 2100. For ease of description, in a portion of the drawings, the first and second coils 2430 and 2730 are illustrated as being disposed on a side of the carrier 2300. However, referring to FIG. 8, both of the first and second coils 2430 and 2730 may be mounted in the housing 2100.

The first and second magnets 2420 and 2720 are movable members moved together with the lens module 2500 in a direction perpendicular to the optical axis (the Z-axis), and the first and second coils 2430 and 2730 are fixed members fixed to the housing 2100. However, the configuration is not limited thereto, and positions of the first and second magnets 2420 and 2720 and the first and second coils 2430 and 2730 are interchangeable with each other.

The shake correction driving unit may use a closed loop control method in which the positions of the frame 2400 and the lens holder 2700 are continuously sensed and reflected on driving. Accordingly, the frame 2400 and the lens holder 2700 may include first and second position sensors 2460 and 2760, opposing the first and second magnets 2420 and 2470, to sense the positions of the frames 2400 and the lens holder 2700. In this case, the first and second position sensors 2460 and 2760 may be provided inside or by the first and second coils 2430 and 2730 of the substrate 2130.

This example includes all structures in which one or two or more first and second coils 2430 and 2730, opposing the first and second magnets 2420 and 2720 provided on the frame 2400 and the lens holder 2700, are provided, respectively. When two or more first and second coils 2430 and 2730 are provided, the amount of magnetic flux may be adjusted to more efficiently prevent leakage of the magnetic flux.

In the camera module 2000 according to this example, all side surfaces of the housing 2100 using a VCM actuator using a magnet and a coil may be finished with a yoke capable of preventing leakage of magnetic flux. As a result, magnetic field leakage of the camera module 2000 may be effectively prevented.

As described above, leakage of a magnetic field may be significantly reduced while employing an actuator using a magnet and a coil. Thus, miniaturization and accurate driving of a camera module may be achieved.

In addition, even when camera modules are arranged to be adjacent to each other, magnetic field interference may be significantly reduced. Thus, the camera modules may be freely arranged.

While this disclosure includes specific examples, it will be apparent after an understanding of the disclosure of this application that various changes in forms and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module comprising:
a carrier supported on a housing and movable in an optical axis direction;
at least one frame supported on the carrier and movable, relative to the carrier, in at least one direction perpendicular to the optical axis direction; and
a lens module supported on the at least one frame,
wherein the at least one frame is supported on the carrier such that attractive force acts in the at least one direction perpendicular to the optical axis direction.

2. The camera module of claim 1, further comprising a yoke disposed on a side surface of the housing that supports the at least one frame, wherein the yoke comprises a material configured to prevent leakage of a magnetic field.

3. The camera module of claim 1, wherein the at least one frame comprises a first frame, and the first frame is supported on the carrier such that attractive force acts in a first direction perpendicular to the optical axis direction.

4. The camera module of claim 3, wherein the lens module is supported on the first frame such that attractive force acts in a second direction perpendicular to the optical axis direction and perpendicular to the first direction.

5. The camera module of claim 4, wherein the first frame comprises a first magnet and the lens module comprises a second magnet,
the housing comprises a first yoke and a second yoke, and
the first magnet and the first yoke are arranged at a first interval along the first direction, and the second magnet and the second yoke are arranged at a second interval along the second direction.

6. The camera module of claim 4, wherein the first frame comprises a first magnet and the lens module comprises a second magnet,
the first magnet is magnetized to have at least N and S poles along a surface opposing the carrier along the first direction perpendicular to the optical axis direction, and
the second magnet is magnetized to have at least N and S poles along a surface opposing the carrier along the second direction perpendicular to the optical axis direction.

7. The camera module of claim 6, wherein the first frame is movable, relative to the carrier, along a direction perpendicular to the first direction, and
the lens module is movable, relative to the first frame, along a direction perpendicular to the second direction.

8. The camera module of claim 1, wherein the at least one frame comprises a first frame and a second frame.

9. The camera module of claim 8, wherein the first frame is closely supported to a first surface of the carrier parallel to the optical axis direction, and the second frame is closely supported to a second surface of the carrier parallel to the optical axis direction.

10. The camera module of claim 9, wherein the first frame and the second frame are relatively movable along a contact surface of the carrier along the at least one direction perpendicular to the optical axis direction.

11. The camera module of claim 8, wherein the first frame comprises a first magnet and the second frame comprises a second magnet,
the housing comprises a first yoke and a second yoke, and
the first magnet and the first yoke are arranged at a first interval along a first direction perpendicular to the optical axis direction, and the second magnet and the second yoke are arranged at a second interval along a second direction perpendicular to the optical axis direction.

12. The camera module of claim 11, wherein the lens module comprises a lens barrel, including at least one lens accommodated therein, and a lens holder accommodating the lens barrel therein, and the lens holder is interposed between the first frame and the second frame along the optical axis direction.

13. The camera module of claim 12, wherein the lens holder is configured to be movable along a direction perpendicular to the first direction, or to be movable together with the second frame along a direction perpendicular to the second direction.

14. The camera module of claim 12, further comprising rolling members disposed between the first frame and the lens holder and between the second frame and the lens holder along the optical axis direction, respectively.

15. The camera module of claim 8, wherein the first frame comprises a first magnet and the second frame comprises a second magnet, and each of the first magnet and the second magnet is magnetized to have at least N and S poles along an opposing surface of the housing along the at least one direction perpendicular to the optical axis direction.

16. A camera module comprising:

an autofocusing part comprising a carrier supported on a housing and configured to be movable in an optical axis direction; and a shake correction portion comprising at least one frame movable, relative to the carrier, in at least one direction perpendicular to the optical axis direction and a lens module supported on the frame, wherein the carrier and the at least one frame are configured to be movable on a surface parallel to the optical axis direction while a rolling member is interposed between a relative member and the carrier and the at least one frame.

17. A camera module comprising:

an autofocusing part comprising a carrier disposed on a housing and configured to be movable in an optical axis direction;

a shake correction unit comprising a lens module configured to be movable, relative to the carrier, in at least one direction perpendicular to the optical axis direction; and an autofocusing coil, configured to provide driving force to the autofocusing part, and first and second shake correction coils configured to provide driving force to the shake correction portion, wherein the autofocusing coil and the first and second shake correction coils are disposed on surfaces of the housing parallel to the optical axis direction, and the housing comprises a plurality of yokes, respectively covering the autofocusing coil and the first and second shake correction coils to prevent leakage of a magnetic field.

18. A camera module comprising:

a first member configured to move along an optical axis direction and comprising a first magnet configured to generate force to move the first member along a first direction perpendicular to an optical axis;

a second member configured to be coupled to the first member and comprising a second magnet configured to generate force to move the second member relative to the first member along a second direction perpendicular to the optical axis;

a lens barrel fixed to the first member and configured to be moved along the first direction by movement of the first member and to be moved along the second direction by movement of the second member relative to the first member;

a carrier configured to accommodate the first member and the second member and to move along the optical axis direction; and a housing comprising a first yoke and second yoke, wherein the first member and the second member are closely supported on a sidewall of the carrier parallel to the optical axis direction by attractive force with the first yoke and the second yoke.

* * * * *